Nov. 30, 1926.
W. H. BARLING
LANDING GEAR
Filed April 18, 1924    2 Sheets-Sheet 2
1,608,763
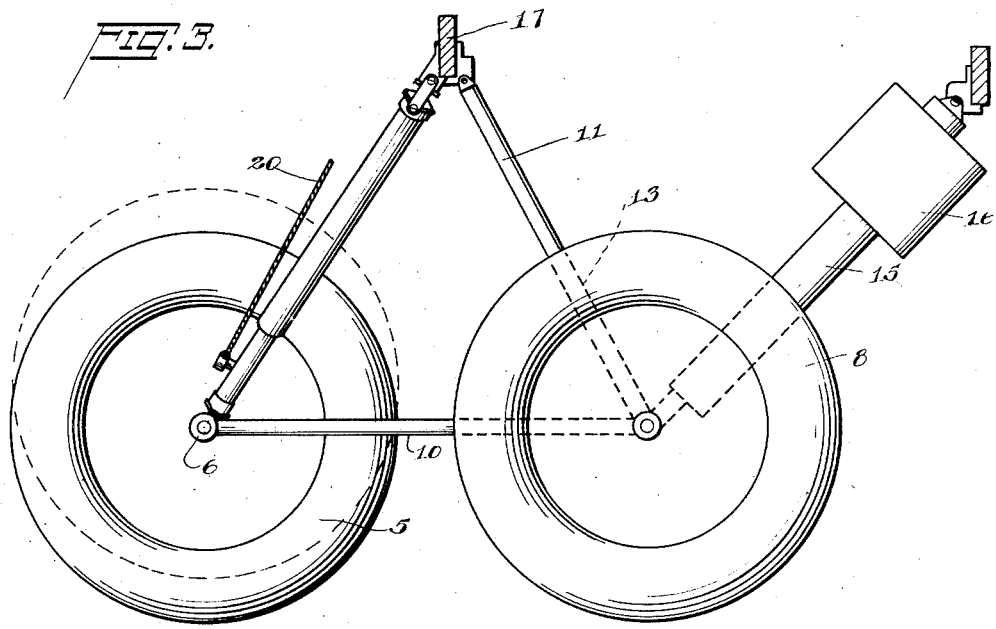
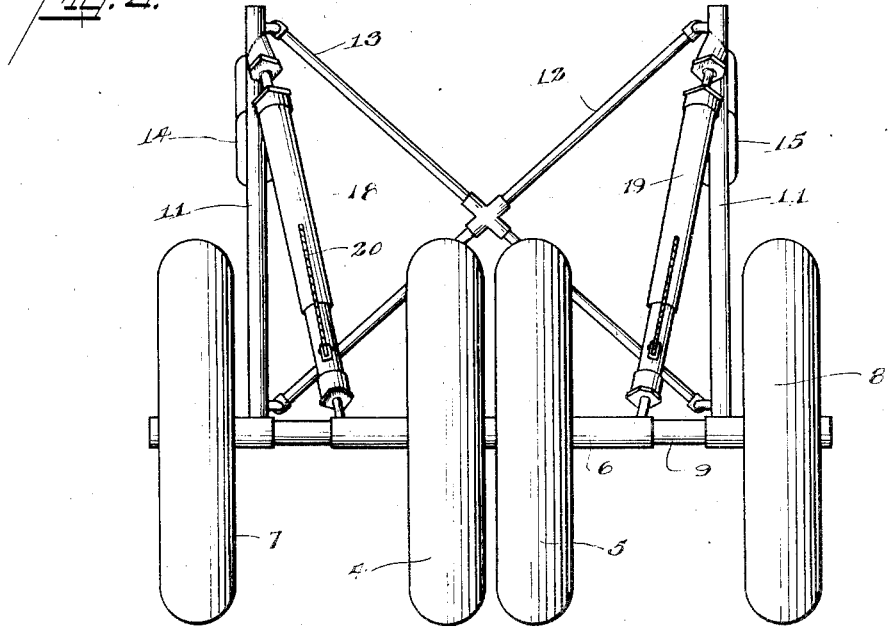
INVENTOR
Walter H. Barling
BY
Robert H. Young  ATTORNEY Patented Nov. 30, 1926.

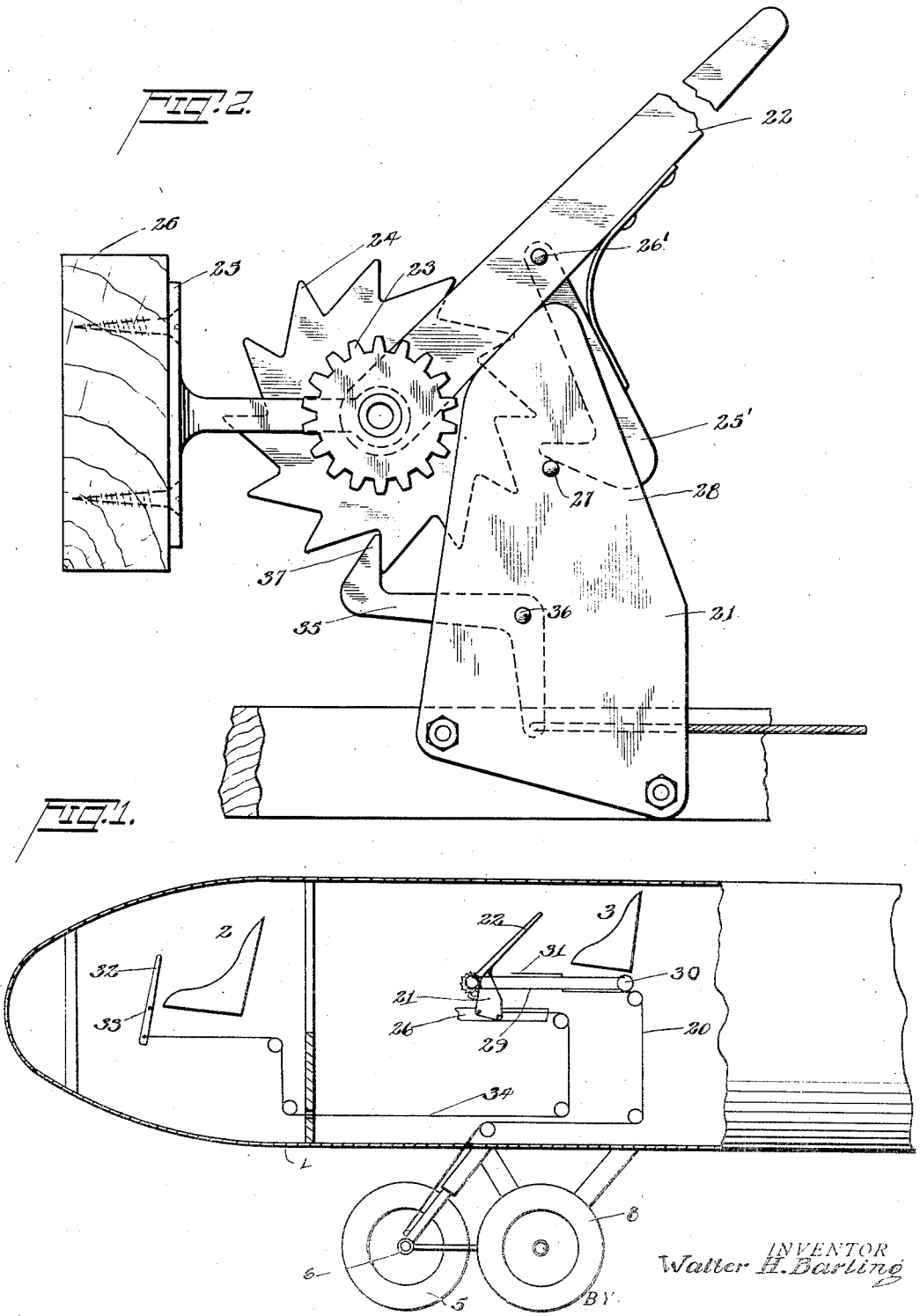

1,608,763

UNITED STATES PATENT OFFICE.

WALTER H. BARLING, OF DAYTON, OHIO.

LANDING GEAR.

Application filed April 18, 1924. Serial No. 707,384.

This invention relates to aircraft landing gears in general, and more particularly to a type particularly adapted for large aircraft. The primary object of the invention is the provision of a landing gear which will be provided with a shock absorber so that the airplane will be prevented from nosing over and so that a smooth landing free from sudden jars will be permitted.

A further object is the provision of a means for jacking a shock absorbing wheel to an inoperative raised position and the provision of a suitable arrangement so that this wheel may be released when desired before the time of landing.

Further objects will be more fully set forth in the attached specification and in the claims, and in the drawings, in which:

Fig. 1 is a side elevation of the front part of an airplane provided with my invention.

Fig. 2 is a detailed view of the jack.

Fig. 3 is a side elevation of the landing gear employed, and

Fig. 4 is a front elevation of the same.

As shown in the drawings, 1 indicates a fuselage of a large aircraft which is provided with a pilot's station as indicated by numeral 2, and an engineer's station, indicated by the numeral 3. Suitable plane and steering surfaces, not shown, of any desired type may be used. The lower side of the fuselage or of the planes is provided with one or more landing gear assemblies consisting of two central tires 4 and 5 forming a central forward shock absorbing wheel which is mounted upon an axle 6. Two wheels 7 and 8 located at points remote from the central axial plane of the landing gear assembly are provided upon an assembly 9 which is connected to the forward axle 6 by means of forward diagonally extending rods or braces 10. The rear axle is braced by a rigid connection 11 in the form of a strut which is connected to the lower part of the plane or fuselage. Two diagonally extending means 12 and 13 also connect the fuselage at that point with the lower ends of connections 11 near the axle of the rear wheels 7 and 8. The axle 9 is also connected to a point in the fuselage to the rear thereof by means of upwardly and rearwardly extending braces 14 and 15 which are connected by means of suitable shock absorbers 16 to the fuselage. The vertical arcuate movement of the rear wheels is thus permitted in order to absorb the major shocks of landing.

The forward axle 6 is connected to the beam 17 of the fuselage or wing by means of hydraulic shock absorbing braces 18 and 19 of the dash pot type. These braces consist of two telescopically arranged plungers between which is held a quantity of liquid so as to cushion the landing shocks and so as to absorb the initial shock of landing to a large extent.

Referring particularly to Fig. 3, the dotted line position of the forward wheel shows the position at which it is raised by means of a cord or cable 20 attached to each of the braces 18 and 19 at one end and extending over a suitable system of pulleys to a jack 21 shown in Figs. 2 and 3. This jack is located so as to be convenient to the engineer's station 3 and consists of a handle 22 which is adapted to rotate the sprocket gear 23 through the action of a ratchet wheel 24 pivotally supported by means of a suitable bracket 25 to a part of the fuselage framework 26. The ratchet wheel 24 is adapted to be rotated by steps through the action of the hook-shaped link 25' pivoted at 26' to the lever 22. A stop 27 in the form of a pin attached to the side plates 28 of the jack normally maintains this link 25' out of engagement with the teeth of the gear 24. The gear 23 is connected by means of a suitable chain or sprocket 29 to a second similar gear 30 and the cable 20 is attached to an intermediate point in this chain. Where a plurality of landing gear assemblies are used, one on each side of the central axis of the airplane, a second cable 31 is attached to the central part of the sprocket chain 29 so that both cables may be pulled upon or loosened at the same time.

Located adjacent the pilot's station is a lever 32 pivoted at 33 so that when it is pulled by the operator, a pull is exerted upon the cable 34 which is passed through a suitable system of pulleys to a pawl 35 pivoted at 36 on the jack. This pawl has a tooth 37 which is normally in engagement with the teeth of the gear 24 so that the gear 24 is normally prevented from rotation in an undesired direction by means of this pawl.

Whenever desired, the pilot may pull upon the lever so as to remove the pawl from engagement with the gear 24 and allow the weight of the forward shock absorbing wheel to cause it to assume the position in which it is considerably below the level of the rear wheels 7 and 8 so that the hydraulic shock absorber is in a position to be immediately and fully effective when the airplane touches the ground. At such time, the forward wheels being lowered, touch the ground first and the initial shock of landing is absorbed through the hydraulic dash pot shock absorber, the main landing forces being assumed by the rear wheels 7 and 8 as controlled by the shock absorbers 16.

Where the engineer is given the duty of raising the wheel after the aircraft has taken to the air so that it may assume a position more closely adjacent the wing of the fuselage and so that it will be in a position more nearly in front of the rear wheel assemblies and braces, it is essential that the pilot's control be one which may be operated at any moment regardless of the state of the apparatus controlled by the engineer. For this reason the arrangement by which the master's pawl 35 is connected to the pilot's control lever 32 furnishes a means which may release the sprocket wheel 24 irrespective of whether the engineer is at the time engaged in raising the wheels to their normal inoperative position.

I claim:—

1. In an aircraft landing gear assembly comprising a rear wheel and a forward shock absorbing wheel, hydraulic shock absorbing means for said forward wheel, mechanism in the aircraft remote from the pilot's station for raising the forward wheel while in flight, and means convenient to the pilot's station for rendering the mechanism inoperative.

2. In an aircraft, a landing gear assembly comprising a rear wheel and a forward shock absorbing wheel, hydraulic shock absorbing means for said forward wheel, manually controlled power means located remote from the pilot's station in the aircraft for raising the forward wheel only to an inoperative position while in flight, a pilot's station, and means located adjacent thereto for releasing said forward wheel.

3. In an aircraft, a fuselage, a landing gear assembly comprising two spaced rear wheels and a forward shock absorbing wheel, hydraulic shock absorbing means for said forward wheel, a pilot's station and an engineer's station in said fuselage, a jack located adjacent the engineer's station, a pawl therefor, means interconnecting said jack and said landing gear so that said jack may raise the forward wheel while in flight, and means located adjacent the pilot's station for releasing the pawl of said jack to render said jack inoperative and to release said forward wheel.

4. In an aircraft, a landing gear assembly comprising two wheels at a distance from a longitudinal plane of the assembly and a forward shock absorbing wheel centrally located with respect to the central longitudinal plane, hydraulic shock absorbing means for said forward wheel, means in the aircraft for raising said forward wheel only while in flight, and a device remote from said last-named means for releasing said forward wheel.

In testimony whereof I affix my signature.

WALTER H. BARLING.